US009879563B2

(12) United States Patent
Phillips et al.

(10) Patent No.: US 9,879,563 B2
(45) Date of Patent: *Jan. 30, 2018

(54) GAS TURBINE ENGINE WITH GEARED TURBOFAN AND OIL THERMAL MANAGEMENT SYSTEM

(71) Applicant: UNITED TECHNOLOGIES CORPORATION, Hartford, CT (US)

(72) Inventors: Kathleen R. Phillips, Coventry, CT (US); Thomas G. Phillips, Coventry, CT (US); Ethan K. Stearns, Mansfield, CT (US)

(73) Assignee: United Technologies Corporation, Farmington, CT (US)

( * ) Notice: Subject to any disclaimer, the term of this patent is extended or adjusted under 35 U.S.C. 154(b) by 688 days.

This patent is subject to a terminal disclaimer.

(21) Appl. No.: 13/794,976

(22) Filed: Mar. 12, 2013

(65) Prior Publication Data

US 2014/0083076 A1     Mar. 27, 2014

Related U.S. Application Data

(63) Continuation of application No. 13/361,997, filed on Jan. 31, 2012, now Pat. No. 8,443,582.

(51) Int. Cl.
*F01D 25/20*     (2006.01)
*F01D 25/18*     (2006.01)
(Continued)

(52) U.S. Cl.
CPC ............ *F01D 25/20* (2013.01); *F01D 25/18* (2013.01); *F01M 5/002* (2013.01); *F02C 7/06* (2013.01);
(Continued)

(58) Field of Classification Search
USPC ........ 60/39.08, 266, 267, 226.1; 165/104.11; 184/6.11
See application file for complete search history.

(56) References Cited

U.S. PATENT DOCUMENTS 3,287,906 A     11/1966     McCormick
4,020,632 A  *  5/1977     Coffinberry et al. ........... 60/773
(Continued)

FOREIGN PATENT DOCUMENTS

EP     1923542 A2     5/2008
EP     1930557 A2     6/2008
(Continued)

OTHER PUBLICATIONS

Jane's Aero-Engines, Issue Seven, Copyright 2000, pp. 510-512.
(Continued)

*Primary Examiner* — Arun Goyal
(74) *Attorney, Agent, or Firm* — Carlson, Gaskey & Olds, PC

(57) ABSTRACT

A lubricant supply system for a gas turbine engine has a lubricant lube pump delivering lubricant to an outlet line. The outlet line is split into at least a hot line and into a cool line, with the hot line directed primarily to locations associated with an engine that are not intended to receive cooler lubricant, and the cool line directed through one or more heat exchangers at which lubricant is cooled. The cool line then is routed to a fan drive gear for an associated gas turbine engine. A method and apparatus are disclosed.

6 Claims, 2 Drawing Sheets

(51) Int. Cl.
F02K 9/64 (2006.01)
F02C 7/06 (2006.01)
F02C 7/14 (2006.01)
F01M 5/00 (2006.01)

(52) U.S. Cl.
CPC ............ F02C 7/14 (2013.01); F02K 9/64 (2013.01); F05D 2260/213 (2013.01); F05D 2260/40311 (2013.01); Y02T 50/676 (2013.01)

(56) References Cited

U.S. PATENT DOCUMENTS

| | | | |
|---|---|---|---|
| 4,741,152 | A | 5/1988 | Burr et al. |
| 5,915,917 | A | 6/1999 | Eveker et al. |
| 6,223,616 | B1 * | 5/2001 | Sheridan ................. 74/468 |
| 6,651,441 | B2 | 11/2003 | Reuter et al. |
| 7,694,505 | B2 | 4/2010 | Schilling |
| 8,261,527 | B1 * | 9/2012 | Stearns et al. ............ 60/39.08 |
| 8,443,582 | B1 * | 5/2013 | Phillips et al. ........... 60/39.08 |
| 8,495,857 | B2 * | 7/2013 | Papa et al. ............... 60/39.08 |
| 8,776,952 | B2 * | 7/2014 | Schwarz ............. F01D 25/125 165/86 |
| 2008/0110596 | A1 | 5/2008 | Schwarz et al. |
| 2009/0320488 | A1 | 12/2009 | Gilson et al. |
| 2010/0148396 | A1 | 6/2010 | Xie et al. |
| 2010/0205977 | A1 | 8/2010 | Annigeri et al. |
| 2010/0331139 | A1 | 12/2010 | McCune |

FOREIGN PATENT DOCUMENTS

| | | |
|---|---|---|
| EP | 2587024 A2 | 5/2013 |
| GB | 1516041 | 6/1978 |
| GB | 2041090 | 9/1980 |
| WO | 2007038674 | 4/2007 |

OTHER PUBLICATIONS

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau, K, Gu, C., and Hui, D. (2005). A critical review on nanotube and nanotube/nanoclay related polymer composite materials. Composites: Part B 37(2006) 425-436.

Shorter Oxford English dictionary, fifth Edition. (2007). vol. 2, N-Z. p. 1888.

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 1.30E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467. pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

Supplementary European Search Report for European Application No. 13775295.2 received Nov. 30, 2015.

* cited by examiner

GAS TURBINE ENGINE WITH GEARED TURBOFAN AND OIL THERMAL MANAGEMENT SYSTEM

CROSS-REFERENCE TO RELATED APPLICATION

This application is a continuation of co-pending application Ser. No. 13/361,997, filed on 31 Jan. 2012.

BACKGROUND

This application relates to an oil system for providing oil to a gear associated with a geared turbofan in a gas turbine engine.

Gas turbine engines are known, and typically include a fan delivering air into a compressor section. Compressed air from the compressor section is delivered into a combustion section, mixed with fuel, and ignited. Products of this combustion pass downstream over turbine rotors which are driven to rotate.

A low pressure turbine rotor drives a low pressure compressor, and traditionally has driven a fan at the same rate of speed.

More recently, a gear reduction has been included between the low pressure turbine and the fan such that the fan and the low pressure compressor can rotate at different speeds.

Oil management systems are known, and typically provide oil to engine bearings and other locations within the engine. As a result of gears being added to turbofan engines, additional components require cooling, thereby necessitating new cooling systems and methodologies.

SUMMARY

In a featured embodiment, a lubricant supply system for a gas turbine engine has a lubricant pump delivering lubricant to an outlet line, which is split into at least a hot line and a cool line. The hot line is directed primarily to locations associated with an engine that are not intended to receive cooler lubricant. The cool line is directed through one or more heat exchangers at which lubricant is cooled, and is then routed to a fan drive gear. At least one of the one or more heat exchangers is a fuel/oil cooler. The fuel/oil cooler is downstream of a point where the outlet line splits into the hot line and the cool line, such that the hot line is not directed through the fuel/oil cooler.

In another embodiment according to the previous embodiment, the cool line supplies lubricant to a journal bearing in the fan drive gear.

In another embodiment according to any of the previous embodiments, a valve selectively supplies lubricant from the hot line to the fan drive gear when additional lubricant is necessary.

In another embodiment according to any of the previous embodiments, the hot line intermixes with a portion of the lubricant in the cool line prior to being directed to the locations associated with an engine that are not intended to receive cooler lubricant.

In another embodiment according to any of the previous embodiments, the hot line does not intermix back into the cool line until a point after the cool line has been routed to a bearing for the fan drive gear.

In another featured embodiment, a gas turbine engine has a fan, a compressor section, including a low pressure compressor section and a high pressure compressor section, a combustor, a turbine section including both a low pressure turbine and a high pressure turbine section. The low pressure turbine section drives the low pressure compressor section. A fan drive gear is provided such that the low pressure turbine further drives the fan, with the fan and low pressure compressor being driven at different rates. A lubricant system includes a lubricant pump that delivers lubricant to an outlet line. The outlet line splits into at least a hot line and a cool line. The hot line is directed primarily to locations in the gas turbine engine that are not intended to receive cooler lubricant. The cool line is directed through one or more heat exchangers at which the lubricant is cooled. The cool line is then routed to the fan drive gear. At least one of the one or more heat exchangers is a fuel/oil cooler at which the lubricant will be cooled by fuel leading to a combustion section for the gas turbine engine. The fuel/oil cooler is downstream of a point where the outlet line splits into the hot line and the cool line, such that the hot line is not directed through the fuel/oil cooler.

In another embodiment according to the previous embodiment, the locations in the engine that are not intended to receive cooler lubricant include bearings associated with at least the turbine section.

In another embodiment according to any of the previous embodiments, the cool line supplies lubricant to a journal bearing in the fan drive gear.

In another embodiment according to any of the previous embodiments, a valve selectively supplies lubricant from the hot line to the fan drive gear when additional lubricant is necessary.

In another embodiment according to any of the previous embodiments, lubricant in the hot line does not intermix back into the cool line until a point after the cool line has been routed to a bearing for the fan drive gear.

In another embodiment according to any of the previous embodiments, the lubricant in the hot line is intermixed with a portion of the lubricant from the cool line prior to being delivered to the locations in the gas turbine engine that are not intended to receive cooler lubricant.

In another featured embodiment, a lubricant supply system for a gas turbine engine has a lubricant pump delivering lubricant to an outlet line. The outlet line splits into at least a hot line and a cool line. The hot line is directed primarily to locations associated with an engine that are not intended to receive cooler lubricant. The cool line is directed through one or more heat exchangers at which lubricant is cooled. The cool line is then routed to a fan drive gear. A valve is positioned on the cool line, at a location downstream of a point where the hot line splits off from the cool line. The valve splits the cool line into two lines, with a first line directed through one or more heat exchanger, and a second line directed through at least one other cooler.

In another embodiment according to the previous embodiment, the at least one other cooler is an air-to-oil cooler.

In another embodiment according to any of the previous embodiments, the at least one other cooler also includes an air-to-oil cooler at which oil from a generator exchanges heat with the oil in the second line.

In another embodiment according to any of the previous embodiments, one or more heat exchanger includes a fuel/oil cooler at which the lubricant in the first line will be cooled by fuel leading to a combustion section for a gas turbine engine. The fuel/oil cooler is downstream of a point where the outlet line splits into the hot line and the cool line, and such that the hot line is not directed through the fuel/oil cooler.

In another embodiment according to any of the previous embodiments, the hot line does not intermix back into the cool line until a point after the cool line has been routed to a bearing for the fan drive gear.

In another embodiment according to any of the previous embodiments, one or more heat exchangers, and at least one other cooler, include at least one of a fuel/oil cooler, an air/oil cooler and an oil/oil cooler.

In another featured embodiment, a gas turbine engine has a fan, a compressor section including a low pressure compressor section and a high pressure compressor section, a combustor, and a turbine section including both a low pressure turbine and a high pressure turbine section. The low pressure turbine section drives the low pressure compressor section. A fan drive gear is provided such that the low pressure turbine further drives the fan, with the fan and the low pressure compressor being driven at different rates. A lubricant system includes a lubricant pump delivering lubricant to an outlet line. The outlet line splits into at least a hot line and a cool line. The hot line is directed primarily to locations in the gas turbine engine that are not intended to receive cooler lubricant. The cool line is directed through one or more heat exchangers at which the lubricant is cooled. The cool line is then routed to the fan drive gear. A valve is positioned on the cool line, at a location downstream of a point where the hot line splits off from the cool line. The valve splits the cool line into two lines, with a first line being directed through one or more heat exchanger, and a second line being directed through at least one other cooler.

In another embodiment according to the previous embodiment, the at least one other cooler is an air-to-oil cooler.

In another embodiment according to any of the previous embodiments, at least one other cooler also includes an air-to-oil cooler at which oil from a generator exchanges heat with the oil in the second line.

In another embodiment according to any of the previous embodiments, one or more heat exchanger includes a fuel/oil cooler at which the lubricant in the first line will be cooled by fuel leading to a combustion section for a gas turbine engine. The fuel/oil cooler is downstream of a point where the outlet line splits into the hot line and the cool line, and such that the hot line is not directed through the fuel/oil cooler.

In another embodiment according to any of the previous embodiments, lubricant in the hot line does not intermix back into the cool line until a point after the cool line has been routed to a bearing for the fan drive gear.

In another embodiment according to any of the previous embodiments, one or more heat exchangers, and at least one other cooler, include at least one of a fuel/oil cooler, an air/oil cooler and an oil/oil cooler.

DETAILED DESCRIPTION

Figure 1:
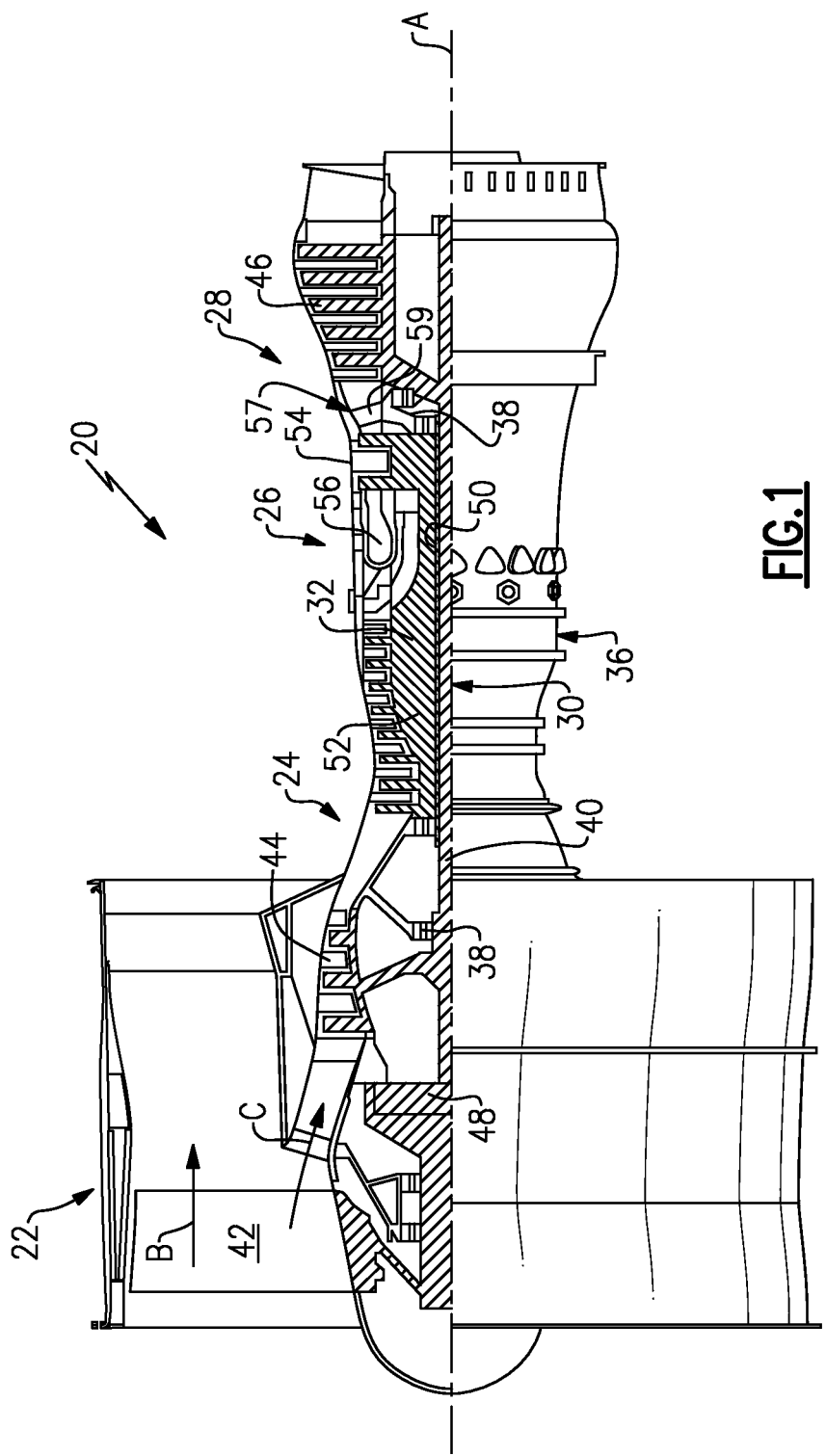
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 (shown schematically) to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the previously mentioned expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFCT')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram °R})/(518.7°R)]^{0.5}$. The "Low corrected fan tip speed" as disclosed herein according to one non-limiting embodiment is less than about 1150 ft/second.

Figure 2:
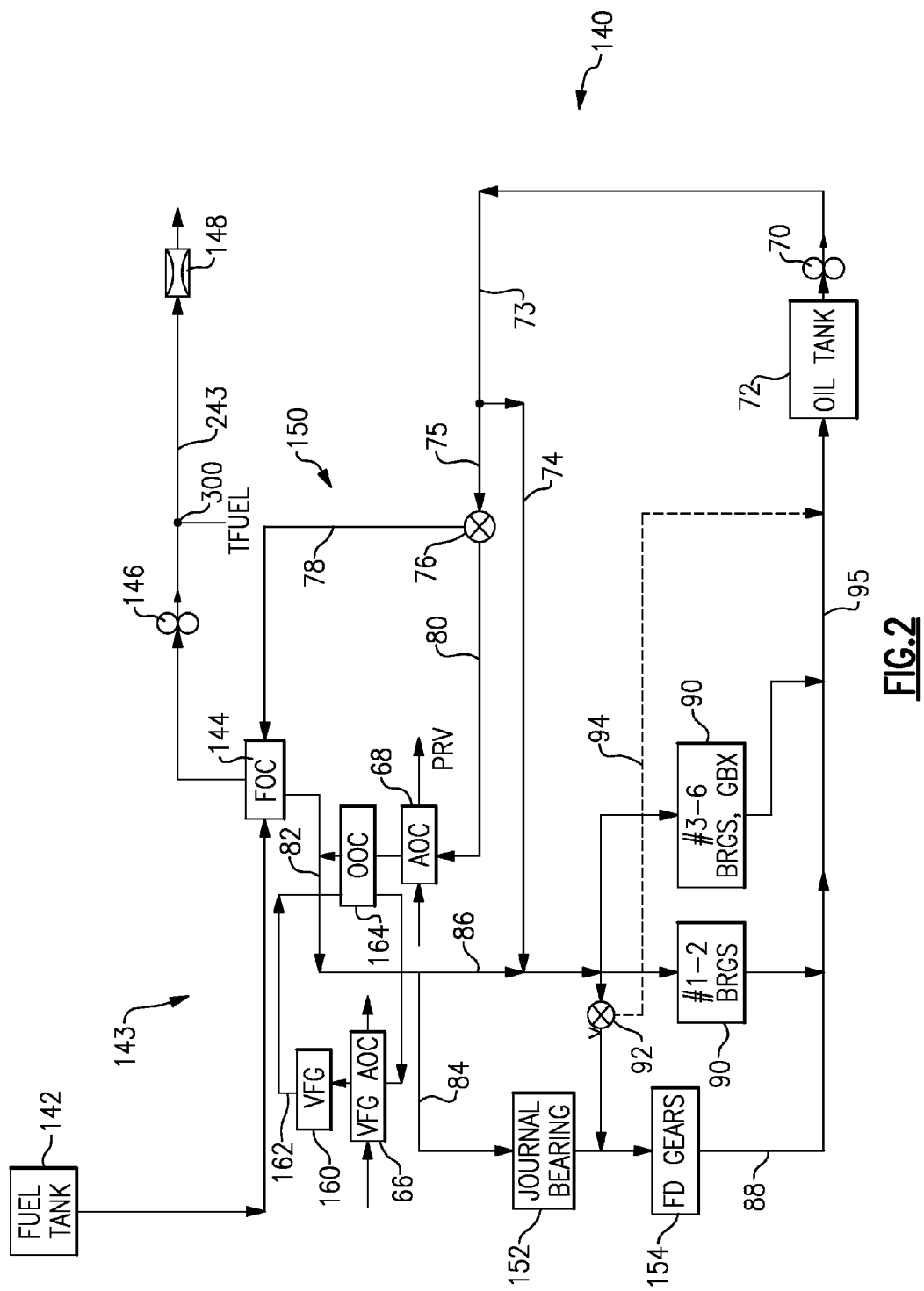
FIG. 2 is a schematic of an oil management system for the gas turbine engine of FIG. 1.

FIG. 2 is an oil management system for the gas turbine engine system of FIG. 1. The oil management system 140 is utilized in association with a fuel system 143, and a variable frequency generator 160 and its oil cooling system circuit 162.

Fuel from a fuel tank 142 passes to a fuel/oil cooler 144. The fuel is heated, and cools a lubricant, as will be explained below. A main fuel pump 146 drives the fuel into further fuel lines 243 and then into nozzles 148 in a combustor, such as combustor 26 as shown in FIG. 1. It is known in the art to heat the fuel to improve the efficiency of the overall engine. The fuel/oil cooler 144 provides this function.

At the same time, the variable frequency generator 160 is driven by turbine rotors to generate electricity for various uses on an aircraft. As shown in oil cooling system circuit 162, the oil passes through an oil-to-oil cooler 164, and may also pass through an air-to-oil cooler 66 before returning to the variable frequency generator 160.

An oil supply system 150 includes a main oil pump 70 taking oil from a main oil tank 72. The terms "oil" and "lubricant" are used interchangeably in this application and cover a fluid used to lubricate surfaces subject to relative rotation. The oil is delivered through a downstream line 73, and split between two lines 74 and 75. The point where the two lines split is a connection that is open, and is not closed by a valve. Line 74 is sent directly to line 86 without cooling. A modulating valve 76 is controlled to achieve a desired fuel temperature. As an example, a sensor 300 may send a signal to a control regarding a sensed temperature of the fuel downstream of the fuel oil cooler 144. The valve 76 routes the volume of oil between line 78 and 80 to achieve the desired temperature of the fuel.

The oil passing to line 78 passes through the fuel/oil cooler 144 and heats the fuel. The oil is cooled before returning to a common downstream line 82. The downstream line 82 could be called a "cool" oil line, as the oil will be cooler than the oil in "hot" line 74 which has not been cooled in any heat exchanger. For purposes of this application, line 75 is seen as part of the "cool" line even though the lubricant has yet to be cooled.

The oil directed by the valve 76 into line 80 passes through an air-to-oil cooler at 68 which is exposed to air which is cooler than the oil in line 80, and which cools the oil. Downstream of the air-to-oil cooler 68, the oil passes through the oil-to-oil cooler 164, and may actually be somewhat heated by cooling the oil for the variable frequency generator. Still, the oil reaching line 82 downstream of the oil-to-oil cooler 164 will be significantly cooler than the oil in line 74. Some of the oil in line 82 is directed into a line 84, to a journal bearing 152, and to the fan drive gears 154. Thus, cooler oil is supplied to the bearing 152 and gears 154 than is supplied from the line 74. As can be seen, a line 86 branches off of the "cool" line 82 at or near the point at which "cool" line 84 breaks away to go to the journal bearing 152 and the gears 154. A return line 88 is downstream of the journal bearing 152 and gears 154. The lubricant in line 86 mixes with the lubricant in "hot" line 74, but downstream of the branch line 84.

It is desirable to provide cooler oil to these locations than is necessary to be supplied to bearings 90, or other locations associated with the engine. The bearings 90 as shown in FIG. 2 may equate to the several locations of bearings 38 as shown in FIG. 1. The journal bearing 152 and the fan drive gears 154 would be part of the geared architecture 48 as shown in FIG. 1.

On the other hand, cooling all of the oil associated with the engine bearings 90 would reduce the overall efficiency of the engine. Thus, splitting the oil, and cooling the oil to be directed to the bearings 152 and/or gears 154 provides cooler oil to those locations, while still allowing the hotter oil to be directed to locations that do not need cooler oil.

In addition, a valve 92 can selectively direct additional oil to the gears 154 if additional oil is necessary, such as at high power times. At other times, the valve 92 may direct lubricant through line 94 back to a return line 95 leading back to the oil tank 72.

The overall configuration thus results in an oil supply system which directs hotter oil to the locations which do not need cooler oil, but which also cools oil to be directed to areas associated with the fan drive gear.

Further details of a similar oil management system are disclosed in co-pending U.S. patent application Ser. No. 13/362,094, entitled "Gas Turbine Engine With Geared Turbofan and Oil Thermal Management System With Unique Heat Exchanger Structure, owned by the assignee of the present application.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A lubricant supply system for a gas turbine engine comprising:
   a lubricant pump delivering lubricant to an outlet line, said outlet line splitting into at least a hot line and into a cool line, said hot line being directed primarily to locations associated with an engine that are not intended to receive cooler lubricant, and said cool line being directed through one or more heat exchangers at which lubricant is cooled, and said cool line then being routed to a fan drive gear;
   at least one of said one or more heat exchangers is a fuel/oil cooler, and said fuel/oil cooler being downstream of a point where said outlet line splits into said at least said hot line and said cool line, such that said hot line is not directed through any of said one or more heat exchangers, and
   said cool line supplies lubricant to a journal bearing in the fan drive gear and a portion of the lubricant from said cool line is mixed with said hot line to supply to the locations associated with the engine that are not intended to receive cooler lubricant.

2. A gas turbine engine comprising:
   a fan, a compressor section, including a low pressure compressor section and a high pressure compressor section;
   a combustor;
   a turbine section including both a low pressure turbine section and a high pressure turbine section, and said low pressure turbine section driving said low pressure compressor section, and a fan drive gear provided such that said low pressure turbine section further driving said fan, with said fan and said low pressure compressor section being driven at different rates;

a lubricant system including a lubricant pump delivering lubricant to an outlet line, said outlet line splitting into at least a hot line and into a cool line, said hot line being directed primarily to locations in the gas turbine engine that are not intended to receive cooler lubricant, and said cool line being directed through one or more heat exchangers at which the lubricant is cooled, and said cool line then being routed to said fan drive gear;

at least one of said one or more heat exchangers is a fuel/oil cooler at which the lubricant will be cooled by fuel leading to a combustion section for the gas turbine engine, and said fuel/oil cooler being downstream of a point where said outlet line splits into said at least said hot line and said cool line, such that said hot line is not directed through any of said one or more heat exchangers, and said cool line supplies lubricant to a journal bearing in said fan drive gear and a portion of the lubricant from said cool line is mixed with said hot line to supply to the locations in the gas turbine engine that are not intended to receive cooler lubricant.

3. A lubricant supply system for a gas turbine engine comprising:

a lubricant pump delivering lubricant to an outlet line, said outlet line splitting into at least a hot line and into a cool line, said hot line being directed primarily to locations associated with an engine that are not intended to receive cooler lubricant, and said cool line being directed through one or more heat exchangers at which lubricant is cooled, and said cool line then being routed to a fan drive gear;

a valve positioned on said cool line, at a location downstream of a point where said hot line splits off from said cool line, and said valve splitting said cool line into two lines, with a first line being directed through said one or more heat exchanger, and a second line being directed through at least one other cooler;

said one or more heat exchanger include a fuel/oil cooler at which the lubricant in the first line will be cooled by fuel leading to a combustion section for the gas turbine engine, and said fuel/oil cooler being downstream of a point where said outlet line splits into said at least said hot line and said cool line, and such that said hot line is not directed through any of said one or more heat exchangers or said at least one other cooler;

a portion of the lubricant from said cool line is mixed with said hot line to supply to the locations associated with an engine that are not intended to receive cooler lubricant; and said at least one other cooler includes an air-to-oil cooler and also includes an oil-to-oil cooler at which oil from a generator exchanges heat with the oil in said second line.

4. The system as set forth in claim 3, wherein the lubricant in said hot line does not intermix back into said cool line until a point after said cool line has been routed to a bearing for said fan drive gear.

5. A gas turbine engine comprising:

a fan, a compressor section, including a low pressure compressor section and a high pressure compressor section;

a combustor;

a turbine section including both a low pressure turbine section and a high pressure turbine section, and said low pressure turbine section driving said low pressure compressor section, and a fan drive gear provided such that said low pressure turbine section further driving said fan, with said fan and said low pressure compressor section being driven at different rates;

a lubricant system including a lubricant pump delivering lubricant to an outlet line, said outlet line splitting into at least a hot line and into a cool line, said hot line being directed primarily to locations in the gas turbine engine that are not intended to receive cooler lubricant, and said cool line being directed through one or more heat exchangers at which the lubricant is cooled, and said cool line then being routed to said fan drive gear;

a valve positioned on said cool line, at a location downstream of a point where said hot line splits off from said cool line, and said valve splitting said cool line into two lines, with a first line being directed through said one or more heat exchanger, and a second line being directed through at least one other cooler;

said one or more heat exchanger includes fuel/oil cooler at which the lubricant in the first line will be cooled by fuel leading to a combustion section for the gas turbine engine, and said fuel/oil cooler being downstream of a point where said outlet line splits into said at least said hot line and said cool line, and such that said hot line is not directed through any of said one or more heat exchangers or said at least one other cooler;

a portion of the lubricant from said cool line is mixed with said hot line to supply to the locations in the gas turbine engine that are not intended to receive cooler lubricant; and said at least one other cooler includes an air-to-oil cooler and an oil-to-oil cooler at which oil from a generator exchanges heat with the oil in said second line.

6. The engine as set forth in claim 5, wherein the lubricant in said hot line does not intermix back into said cool line until a point after said cool line has been routed to a bearing for said fan drive gear.

* * * * *